United States Patent
Mathur et al.

(10) Patent No.: US 9,652,453 B2
(45) Date of Patent: May 16, 2017

(54) ESTIMATION OF PARAMETERS FOR MACHINE TRANSLATION WITHOUT IN-DOMAIN PARALLEL DATA

(71) Applicant: Xerox Corporation, Norwalk, CT (US)

(72) Inventors: Prashant Mathur, Trento (IT); Sriram Venkatapathy, Grenoble (FR); Nicola Cancedda, London (GB)

(73) Assignee: XEROX CORPORATION, Norwalk, CT (US)

( * ) Notice: Subject to any disclaimer, the term of this patent is extended or adjusted under 35 U.S.C. 154(b) by 286 days.

(21) Appl. No.: 14/252,032

(22) Filed: Apr. 14, 2014

(65) Prior Publication Data

US 2015/0293908 A1    Oct. 15, 2015

(51) Int. Cl.
G06F 17/28    (2006.01)
G06F 17/30    (2006.01)

(52) U.S. Cl.
CPC .... G06F 17/2818 (2013.01); G06F 17/30684 (2013.01)

(58) Field of Classification Search
CPC ... G06F 17/28; G06F 17/2854; G06F 17/2827
USPC ........................................................ 704/2, 4
See application file for complete search history.

(56) References Cited

U.S. PATENT DOCUMENTS

| | | | |
|---|---|---|---|
| 4,980,829 A * | 12/1990 | Okajima | G06F 17/2872 434/157 |
| 6,182,026 B1 | 1/2001 | Tillmann et al. | |
| 6,917,936 B2 | 7/2005 | Cancedda | |
| 7,113,903 B1 * | 9/2006 | Riccardi | G06F 17/2775 704/2 |
| 8,543,563 B1 | 9/2013 | Nikoulina et al. | |
| 2004/0024581 A1 | 2/2004 | Koehn et al. | |
| 2004/0030551 A1 | 2/2004 | Marcu et al. | |
| 2004/0255281 A1 * | 12/2004 | Imamura | G06F 17/2827 717/141 |

(Continued)

OTHER PUBLICATIONS

RWTH, UPVLC, XEROX, EML, "3.1.1: Progress Report on Massive Adaptation", transLectures, Transcription and Translation of Video Lectures, ICT Project 287755 Deliverable 3.1.1, Oct. 31, 2012.*

(Continued)

*Primary Examiner* — Jakieda Jackson
(74) *Attorney, Agent, or Firm* — Fay Sharpe LLP

(57) ABSTRACT

A system and method for estimating parameters for features of a translation scoring function for scoring candidate translations in a target domain are provided. Given a source language corpus for a target domain, a similarity measure is computed between the source corpus and a target domain multi-model, which may be a phrase table derived from phrase tables of comparative domains, weighted as a function of similarity with the source corpus. The parameters of the log-linear function for these comparative domains are known. A mapping function is learned between similarity measure and parameters of the scoring function for the comparative domains. Given the mapping function and the target corpus similarity measure, the parameters of the translation scoring function for the target domain are estimated. For parameters where a mapping function with a threshold correlation is not found, another method for obtaining the target domain parameter can be used.

22 Claims, 5 Drawing Sheets

(56) References Cited

U.S. PATENT DOCUMENTS

| | | | |
|---|---|---|---|
| 2005/0137854 A1* | 6/2005 | Cancedda | G06F 17/28 704/9 |
| 2005/0171758 A1* | 8/2005 | Palmquist | G10L 15/26 704/4 |
| 2006/0190241 A1 | 8/2006 | Goutte et al. | |
| 2007/0094169 A1* | 4/2007 | Yamada | G06F 17/2809 706/15 |
| 2007/0150257 A1 | 6/2007 | Cancedda et al. | |
| 2007/0150260 A1* | 6/2007 | Lee | G06F 17/2818 704/2 |
| 2007/0265825 A1 | 11/2007 | Cancedda et al. | |
| 2008/0208563 A1* | 8/2008 | Sumita | G06F 17/28 704/2 |
| 2008/0249760 A1* | 10/2008 | Marcu | G06F 17/289 704/2 |
| 2008/0262826 A1 | 10/2008 | Pacull | |
| 2008/0281578 A1* | 11/2008 | Kumaran | G06F 17/28 704/2 |
| 2008/0300857 A1 | 12/2008 | Barbaiani et al. | |
| 2009/0063126 A1* | 3/2009 | Itagaki | G06F 17/2818 704/2 |
| 2009/0175545 A1 | 7/2009 | Cancedda et al. | |
| 2009/0319257 A1* | 12/2009 | Blume | G06F 17/278 704/7 |
| 2010/0268527 A1 | 10/2010 | Tomeh et al. | |
| 2011/0022380 A1 | 1/2011 | Zaslavskiy et al. | |
| 2011/0022381 A1* | 1/2011 | Gao | G06F 17/2818 704/7 |
| 2011/0178791 A1 | 7/2011 | Stymne et al. | |
| 2011/0282643 A1 | 11/2011 | Chatterjee et al. | |
| 2011/0288852 A1 | 11/2011 | Dymetman et al. | |
| 2011/0307245 A1 | 12/2011 | Hanneman et al. | |
| 2012/0041753 A1 | 2/2012 | Dymetman | |
| 2012/0101804 A1 | 4/2012 | Roth et al. | |
| 2012/0150529 A1* | 6/2012 | Kim | G06F 17/289 704/2 |
| 2012/0259807 A1 | 10/2012 | Dymetman | |
| 2012/0278060 A1 | 11/2012 | Cancedda et al. | |
| 2013/0006954 A1 | 1/2013 | Nikoulina et al. | |
| 2013/0018650 A1* | 1/2013 | Moore | G06F 17/2818 704/9 |
| 2013/0227522 A1* | 8/2013 | Lerum | G06F 9/44 717/120 |
| 2014/0067363 A1* | 3/2014 | Ogren | G06F 17/2282 704/2 |
| 2014/0214397 A1* | 7/2014 | Dymetman | G06F 17/28 704/2 |
| 2014/0324411 A1* | 10/2014 | Chenon | G06F 17/2836 704/2 |
| 2014/0358519 A1* | 12/2014 | Mirkin | G06F 17/2854 704/3 |

OTHER PUBLICATIONS

Axelrod, Amittai, et al., "Domain adaptation via pseudo in-domain data selection," Proc. Conf. on Empirical Methods in Natural Language Processing, EMNLP '11, pp. 355-362 (2011).
Banerjee, Pratyush, et., al. "Combining multi-domain statistical machine translation models using automatic classifiers", Proc.9$^{th}$ Conf. of the Assoc. for Machine Translation in the Americas, pp. 1-10 (2010).
Bertoldi, et al., "Domain adaptation for statistical machine translation with monolingual resources," Proceedings of the Fourth Workshop on Statistical Machine Translation, StatMT '09, pp. 182-189, Stroudsburg, PA, USA. Association for Computational Linguistics. (2009).
Bisazza, Arianna, et al., "Fill-up versus Interpolation Methods for Phrase-based SMT Adaptation," Intern'l Workshop on Spoken Language Translation (IWSLT), pp. 136-143 (2011).
Bojar, Ondřej, et al., "Findings of the 2013 Workshop on Statistical Machine Translation," Proc. 8th Workshop on Statistical Machine Translation, ACL, pp. 1-44 (Aug. 2013).
Cancedda, Nicola "Private access to phrase tables for statistical machine translation," ACL (2), pp. 23-27 (2012).
Caruana, Rich, "Multitask learning," Mach. Learn., 28(1) pp. 41-75 (1997).
Cettolo, Mauro, et al., "Wit3: Web inventory of transcribed and translated talks," Proc. 16th Conf. of the European Assoc. for Machine Translation (EAMT), pp. 261-268 (May 2012).
Chen, Stanley F., et al., "An empirical study of smoothing techniques for language modeling," Computer Speech and Language, 4(13):359-393 (1999).
Cherry, Colin, et al., "Batch tuning strategies for statistical machine translation," Proc.2012 Conf. of the North American Chapter of the Association for Computational Linguistics: Human Language Technologies, ACL, pp. 427-436 (Jun. 2012).
Civera, Jorge, et al., "Domain adaptation in statistical machine translation with mixture modelling," Proc. 2nd Workshop on Statistical Machine Translation, pp. 177-180 (2007).
Duan, Nan, et al., "Mixture model-based minimum Bayes risk decoding using multiple machine translation systems," Proc.23rd Intern'l Conf. on Computational Linguistics, pp. 313-321 (2010).
Foster, George, et al., "Mixture-model adaptation for SMT," Proc. 2$^{nd}$ Workshop on Statistical Machine Translation, StatMT '07, pp. 128-135 (2007).
Gao, Qin, et al., "Parallel implementations of word alignment tool," Software Engineering, Testing, and Quality Assurance for Natural Language Processing, SETQA-NLP '08, ACL, pp. 49-57 (2008).
Hasler, Eva, et al, "Margin Infused Relaxed Algorithm for Moses," Prague Bulletin of Mathematical Linguistics, 96:pp. 69-78 (2011).
Hopkins, Mark, et al., "Tuning as ranking," Proc. 2011 Conf. on Empirical Methods in Natural Language Processing, ACL, pp. 1352-1362 (Jul. 2011).
Junczys-Dowmunt, Marcin, "Phrasal rank encoding: Exploiting phrase redundancy and translational relations for phrase table compression," Proc. Machine Translation Marathon 2012, The Prague Bulletin of Mathematical Linguistics, vol. 98, pp. 63-74 (2012).
Klementiev, Alexandre, et al., "Toward statistical machine translation without parallel corpora," Proc. 13th Conf. of the European Chapter of the Assoc. for Computational Linguistics pp. 1-11 (Apr. 2012).
Koehn, Philipp, et al., "Experiments in domain adaptation for statistical machine translation," Proc. 2$^{nd}$ Workshop on Statistical Machine Translation, StatMT '07, pp. 224-227 (2007).
Koehn, Philipp, et al., "Moses: Open Source Toolkit for Statistical Machine Translation," Proc. 45th Annual Meeting of the Assoc. for Computational Linguistics, Companion Volume Proceedings of the Demo and Poster Sessions, pp. 177-180 (2007).
Koehn, Philipp, et al., "Towards effective use of training data in statistical machine translation," Proc. 7th Workshop on Statistical Machine Translation, WMT '12, pp. 317-321 (2012).
Koehn, Philipp, et al., "Knowledge sources for word-level translation models," Proc. 2001 Conf. on Empirical Methods in Natural Language Processing, pp. 27-35 (2001).
Levenberg, Abby, et al., "Stream-based translation models for statistical machine translation," Human Language Technologies: The 2010 Annual Conf. of the North American Chapter of the Association for Computational Linguistics (HLT-NAACL'10), pp. 394-402 (2010).
Lopez, Adam, "Tera-scale translation models via pattern matching," Proc. 22nd Intern'l Conf. on Computational Linguistics—vol. 1, pp. 505-512 (2008).
Lopez, Adam et al., "Word-based alignment, phrase-based translation: What's the link?" Proc. AMTA, pp. 90-99 (2006).
Nicola, Bertoldi, et al., "Domain adaptation for statistical machine translation with monolingual resources," Proc. 4th Workshop on Statistical Machine Translation, StatMT '09, pp. 182-189, Association for Computational Linguistics (2009).
Och, Franz Josef, "Minimum Error Rate Training in Statistical Machine Translation," In Erhard Hinrichs and Dan Roth, editors, Proc. 41st Annual Meeting of the Association for Computational Linguistics, pp. 160-167 (2003).

(56) References Cited

OTHER PUBLICATIONS

Papineni, Kishore, Salim Roukos, ToddWard, and Weijing Zhu, "BLEU: a Method for Automatic Evaluation of Machine Translation," Computational Linguistics, pp. 311-318 (2002).

Pecina, Pavel, "Simple and effective parameter tuning for domain adaptation of statistical machine translation," COLING, pp. 2209-2224 (2012).

Razmara, Majid, et al., "Mixing multiple translation models in statistical machine translation," Proc.50th Annual Meeting of the Assoc. for Computational Linguistics: Long Papers—vol. 1, pp. 940-949 (2012).

Sennrich, Rico, "Perplexity minimization for translation model domain adaptation in statistical machine translation," Proc. 13th Conf. of the European Chapter of the Association for Computational Linguistics (EACL '12), ACL, pp. 539-549 (2012).

Sennrich, Rico, et al., "A multi-domain translation model framework for statistical machine translation," Proc.51st Annual Meeting of the Association for Computational Linguistics, vol. 1: Long Papers, pp. 832-840 (2013).

Sennrich, Rico, "Mixture-modeling with unsupervised clusters for domain adaptation in statistical machine translation," Proc. 16th Annual Conf. of the European Association of Machine Translation (EAMT), pp. 185-192 (2012).

Smith, Jason R., et al, "Dirt cheap web-scale parallel text from the common crawl," Proc. 51st Annual Meeting of the Association for Computational Linguistics (vol. 1: Long Papers), pp. 1374-1383 (2013).

Stolcke, Andreas, "Srilm—an extensible language modeling toolkit," Proc. ICSLP, pp. 1-4 (2002).

Tiedemann, Jörg "Parallel data, tools and interfaces in OPUS," in Nicoletta Calzolari (Conference Chair), et al., editors, Proc. 8th Intern'l Conf. on Language Resources and Evaluation (LREC'12), ELRA, pp. 2214-2218 (2012).

Watanabe, Taro, et al., "Online large-margin training for statistical machine translation," Proc. 2007 Joint Conference on Empirical Methods in Natural Language Processing and Computational Natural Language Learning (EMNLP-CoNLL), pp. 764-773 (2007).

Yang, Yi, et al., "I2, 1-norm regularized discriminative feature selection for unsupervised learning," Proc. 22nd Intern'l Joint Conf. on Artificial Intelligence, vol. 2, pp. 1589-1594 (2011).

Zens, Richard, et al., "Efficient phrase-table representation for machine translation with applications to online MT and speech translation," Proc. NAACL HLT, pp. 492-499 (2007).

\* cited by examiner

ESTIMATION OF PARAMETERS FOR MACHINE TRANSLATION WITHOUT IN-DOMAIN PARALLEL DATA

CROSS REFERENCE TO RELATED PATENTS AND APPLICATIONS

Cross reference is made to copending application Ser. No. 14/252,194, filed Apr. 14, 2014, entitled RETRIEVAL OF DOMAIN RELEVANT PHRASE TABLES, by Prashant Mathur, et al., the disclosure of which is incorporated herein by reference in its entirety.

BACKGROUND

The exemplary embodiment relates to Machine Translation (MT) and finds particular application in estimating parameters for a machine translation scoring function when there is a lack of in-domain parallel training data.

Statistical Machine Translation (SMT) systems use a translation scoring function for scoring candidate translations of a source language text string, such as a sentence. Parameters of the scoring function are generally trained on a parallel development corpus containing pairs of source and target sentences which are assumed to be a translation of each other, in at least the source to target direction. In a phrase-based system, the parameters serve as weights for features of the candidate translation, some of which are derived from a phrase table. The phrase table stores corpus statistics for a set of biphrases found in a parallel training corpus. These statistics include phrasal and lexical probabilities that represent the probability that a given source phrase (or its constituent words, in the case of lexical probability) in a biphrase is translated to the corresponding target phrase, or vice versa. In addition to translation model features that are based on such phrasal and lexical probabilities, the translation scoring function may also incorporate parameters of a language model, which focuses only on the target side probabilities of the translation, and parameters of a reordering model, which takes into account the extent to which the words of the translation are reordered when compared with the order of the aligned words of the source sentence. For a new source sentence to be translated, the SMT scoring function is used to evaluate candidate translations formed by combining biphrases from the phrase table which cover the source sentence, where each source word is covered by no more than one biphrase. The respective corpus statistics of these biphrases are retrieved from the phrase table and corresponding features of the scoring function are computed based thereon which aggregate the probabilities for each of the biphrases being used. The scoring function features are weighted by the scoring function parameters in a log-linear combination to determine an optimal set of the biphrases, from which a translation is generated.

One problem which arises in machine translation is that the parameters of the scoring function, and the values of the features themselves, can vary from one domain to another. For example, one feature of the phrase table may be a more reliable predictor of translation quality and thus its parameter should provide a greater weight to the respective feature of the scoring function. The overall quality of translation is thus dependent, in part, on how suited the phrase table is to the domain of interest, but also on how well the weights of the log-linear combination of various translation features are optimized for that domain. Thus, there is considerable interest in generating machine translation systems that are adapted to the particular domain of the text to be translated.

Optimization of the parameters of the scoring function is thus an integral part of building a high quality translation system. One method which has been used for optimization is Minimum Error Rate Training (MERT) (Och, "Minimum Error Rate Training in Statistical Machine Translation," Proc. 41st Annual Meeting of the ACL, pp. 160-167 (2003)). In the MERT approach, an optimal weight vector is computed by minimizing the error on a held-out parallel development set. Another approach uses the Margin Infused Relaxed Algorithm (MIRA) (Hasler, et al., "Margin Infused Relaxed Algorithm for Moses," Prague Bulletin of Mathematical Linguistics, 96:69-78 (2011)). MIRA is an online learning algorithm which scales up to a large number of translation features. For both these algorithms, a commonly used objective function for optimizing the weights is the BLEU score (Papineni, et al., "BLEU: a Method for Automatic Evaluation of Machine Translation," Computational Linguistics, pp. 311-318 (2002)).

Since the parameters of the scoring function tend to be domain dependent, a parallel in-domain corpus called a development corpus, is often used for estimating the parameters. However, such parallel corpora are not always available for a particular domain of interest and may be costly to produce as they generally entail the use of human translators.

It has been suggested that an SMT system may be built by using a large target side monolingual corpus to obtain monolingual features and a bilingual dictionary to build a translation model (Klementiev, et al., "Toward statistical machine translation without parallel corpora," Proc. 13th Conf. of the European Chapter of the Assoc. for Computational Linguistics, pp. 130-140 (April 2012)). However, a parallel development set was used for tuning the parameter estimates using MERT.

It has also been suggested that the parameter estimates tuned for a more general domain can be applied to a more specific domain (Pecina, et al., "Simple and effective parameter tuning for domain adaptation of statistical machine translation," COLING, pp. 2209-2224 (2012)). This is called cross-domain tuning. However, selection of a general domain and tuning of parameters is not straightforward.

There remains a need for a system and method for estimating parameters of a translation scoring function where only source text is available in the relevant domain.

INCORPORATION BY REFERENCE

The following references, the disclosures of which are incorporated herein in their entireties by reference, are mentioned:

Phrase based machine translation systems are disclosed, for example, in U.S. Pat. Nos. 6,182,026 and 8,543,563; U.S. Pub. Nos. 20040024581; 20040030551; 20060190241; 20070150257; 20080300857; 20070265825, 20110022380; 20110178791; 20110282643; 20110288852; 20110307245; 20120041753; 20120101804; 20120259807; 20120278060; 20130006954; and U.S. application Ser. No. 13/596,470, filed on Aug. 28, 2012, entitled LEXICAL AND PHRASAL FEATURE DOMAIN ADAPTATION IN STATISTICAL MACHINE TRANSLATION, by Vassilina Nikoulina, et al.; and U.S. application Ser. No. 13/740,508, filed Jan. 14, 2013, entitled MULTI-DOMAIN MACHINE TRANSLATION MODEL ADAPTATION by Markos Mylonakis, et al. Language models are described, for example, in U.S. Pub. No. 20120278060. Methods for building libraries of parallel corpora from which phrase tables can be generated are disclosed, for example, in U.S. Pub. Nos. 20080262826 and 20100268527. Methods for evaluating the quality of machine translation are disclosed, for example, in U.S. Pub. Nos. 20050137854 and 20090175545 and U.S. Pat. No. 6,917,936.

BRIEF DESCRIPTION

In accordance with one aspect of the exemplary embodiment, a method for estimating parameters for features of a translation scoring function which is suitable for use in scoring candidate translations in a target domain is provided. The method includes receiving a source corpus for a target domain and generating a multi-model for the target domain based on a phrase table for each of a set of comparative domains and a measure of similarity between the source corpus for the target domain and the phrase tables for the comparative domains. For the target domain, a measure of similarity between the source corpus and the target domain multi-model is computed. For each of a plurality of the comparative domains, a measure of similarity between a source corpus for the comparative domain and a respective comparative domain multi-model is computed. The comparative domain multi-model is derived from phrase tables for others of the set of comparative domains. Each of the plurality of comparative domains is associated with parameters for at least some of the features of the translation scoring function. The parameters of the translation scoring function for the target domain are estimated based on the computed measure of similarity between the source corpus and the target domain multi-model, the computed measures of similarity for the comparative domains between the source corpus for the comparative domain and the respective comparative domain multi-model, and the parameters for the scoring function for the comparative domains.

At least one of the steps of the method may be performed with a computer processor.

In accordance with another aspect of the exemplary embodiment, a system for estimating parameters for features of a translation scoring function for performing machine translation in a target domain includes memory which stores a source corpus for a target domain. A similarity computation component computes a measure of similarity between the target domain source corpus and a phrase table for each of a set of comparative domains. A multi-model computation component generates a multi-model for the target domain based on the phrase tables for the comparative domains and the computed measures of similarity. The similarity computation component further computes a measure of similarity between the source corpus and the target domain multi-model and a measure of similarity for each of the comparative domains between a respective comparative domain source corpus and a respective comparative domain multi-model that is derived from phrase tables for others of the set of the comparative domains. Each of the plurality of comparative domains is associated with parameters for at least some of the features of the translation scoring function. A parameter computation component estimates the parameters of the translation scoring function for the target domain based on the computed measure of similarity for the target domain, the computed measures of similarity for the comparative domains, and the parameters for the scoring function for the comparative domains. A processor implements the similarity computation component, multi-model computation component, and parameter computation component.

In accordance with another aspect of the exemplary embodiment, a method for estimating parameters for features of a translation scoring function for scoring candidate translations in a target domain is provided. The method includes, for each of a plurality of parameters of the translation scoring function, learning a mapping function which maps a similarity measure to the parameter of the translation scoring function. The similarity measure is computed between a source corpus for one domain and a respective multi-model derived from phrase tables of other domains. A source corpus for a target domain is received and a multi-model for the target domain is generated, based on phrase tables of comparative domains. A measure of similarity between the target domain source corpus and the target domain multi-model is computed. Based on the computed measure of similarity and the mapping functions, the plurality of parameters for the translation scoring function for the target domain are estimated.

At least one of the leaning of the mapping function, generating of the target domain multi-model, computing the measure of similarity, and the estimating of the set of parameters for the translation scoring function may be performed with a computer processor.

DETAILED DESCRIPTION

Figure 1:
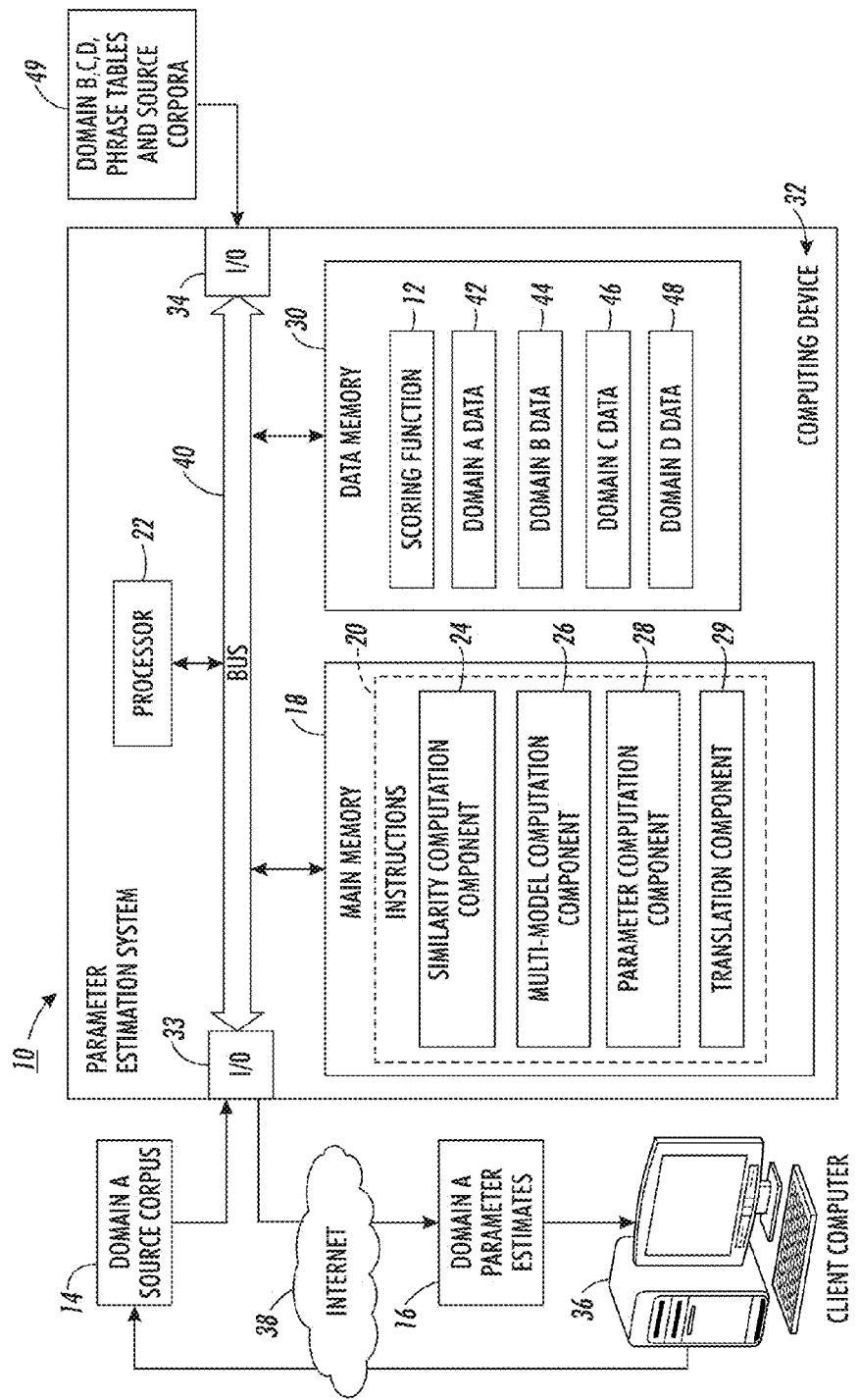
FIG. 1 is a functional block diagram of a system for estimating parameters for a translation scoring function.

A system and method are disclosed for estimating translation scoring parameters for a translation scoring function to be used for translating text in a target domain in the case where no parallel corpus is available, i.e., only a corpus of text in the source language. The system relies on parameter estimates that are computed for out-of-domain corpora (i.e., not in the target domain, referred to herein as comparative domains) and a multi-model for each comparative domain which computed based on a similarity between a source corpus for that comparative domain and phrase tables of others of the comparative domains. A function which relates one or more of the comparative domain parameter estimates and a measure of similarity between each comparative domain monolingual source language corpus and its respective multi-model may be computed. Given the function and a respective similarity measure between the target domain source corpus and a respective multi-model generated from the comparative domains, one or more estimated parameters for the target domain can be derived.

The similarity measure between a given source corpus s and a given phrase table pt is referred to herein as the SIM-PT score, and is described in greater detail in above-mentioned copending application Ser. No. 14/252,194. Then, the parameter estimation is formulated as learning a function that maps the similarity score to the parameter estimates. This function can be learned using supervised methods. Two methods (linear regression (parametric) and nearest neighbor (non-parametric) are contemplated, the choice depending, to some extent, on the nature of the comparative domain corpora. In order to select which method to use, a correlation between the SIM-PT values and the parameter estimates may be performed. Linear regression is used when a good correlation is found.

A "phrase," as used herein generally refers to one or more words in either the source or target language. Here, each word (or, more properly, a token) includes a sequence of characters drawn from a finite alphabet. The alphabet may include punctuation and numbers as well as letters. Thus for example, the phrase "Smith, III, et al." could be a phrase comprising a sequence of seven tokens.

A "biphrase," as used herein, generally comprises two phrases: a first phrase in the source language and a second phrase in the target language, different from the source language, which is a translation of the first phrase. The phrases may each be contiguous (no gaps between the words) or non-contiguous (containing a gap of one or more words).

A "phrase table" is a data structure which includes a set of such biphrases, which may have been derived from a word-aligned parallel corpus in the respective domain. Each biphrase is associated with a value for each of a set of features. A "multi-model" is a phrase table formed by combining two or more, e.g., several, individual phrase tables of various domains, e.g., in a weighted linear combination.

FIG. 1 illustrates a computer-implemented system 10 for computing parameter estimates for a translation scoring function 12. The translation scoring function can be used for scoring candidate translations of source strings in a target domain (domain A). Given a text string from the target domain which is written in a source natural language, the translation scoring function is used to identify the most probable translation from a set of candidate translations in a target natural language. Each natural language has its own vocabulary and a grammar, such as English and French.

The scoring function 12 may be a log-linear model of the general form:

$$\text{score}(t_1 | s_1) = \frac{1}{Z} \exp\left(\sum_{m=1}^{M} \lambda_m h_m(s_1, t_1)\right) \quad (1)$$

where each feature $h_m$ scores a particular aspect of the relationship between a source language text string, such as a sentence $s_1$ and a candidate translation $t_1$ in the target language, $\lambda_m$ is the respective parameter (stored in the parameter estimates), and Z is an optional normalization constant. See, for example, Christoph Tillmann and Fei Xia, "A Phrase-Based Unigram Model For Statistical Machine Translation," in Proc. HLT-NAACL 2003 Conf., Edmonton, Canada (2003), and Richard Zens and Hermann Ney, "Improvements in Phrase-Based Statistical Machine Translation," Proc. Conf. HLT-NAACL, pp. 257-264 (2004).

Each feature $h_m$ is either an independent feature, or obtained by a linear combination of the features from several component models, as given in Equation (2):

$$h_{pr}(s, t) = \log \sum_{j=1}^{N} \phi_j P_{phr,j}(t | s) \quad (2)$$

which computes the inverse phrasal feature based on the corresponding j phrasal features $P_{phr,j}(t|s)$ of the j biphrases used in generating the candidate translation and respective coefficients $\phi_j$.

As an example, features $h_m$ may include translation model features $t_{m1}, t_{m2}, t_{m3}, t_{m4}$, etc., reordering model features $r_{m1}, r_{m2}, r_{m3}, r_{m4}$, etc., and a language model feature lm. See, for example, U.S. Pub. No. 20070150257 for further details on such features. Some of these features are derived from the phrase table for the target domain. For example, translation model features may include forward (direct) and backward (inverse) lexical and phrasal probability features which are each an aggregation of the respective features of the biphrases that are used to form the candidate translation. In the exemplary embodiment, a preexisting phrase table is not available for the target domain and is generated from the phrase tables which have been created for other domains.

In an example embodiment, the total number of features used in the log-linear scoring function 12 is 14, as in the MOSES translation system, given by:
1. phrase translation model features (5 features)
   (a) inverse phrase translation probability $\phi(s|t)$
   (b) inverse lexical weighting lex(s|t)
   (c) direct phrase translation probability $\phi(t|s)$
   (d) direct lexical weighting lex(t|ts)
   (e) phrase penalty (always exp(1)=2.718)
2. language model (1 feature)
3. word penalty (1 feature)
4. reordering model features (7 features)

The exemplary system 10 takes as input a source corpus 14 (or n-gram counts derived therefrom) and outputs parameter estimates 16, e.g., in the form of a vector of weights, which can be used as the parameters $\lambda_m$ of the translation scoring function 12. A translation system may use the translation scoring function 12 in the translation of new source text by identifying a candidate translation with the highest score.

The system includes main memory 18 which stores instructions 20 for performing the method described below and a processor 22 in communication with the main memory 18 for executing the instructions. The instructions 20 include a similarity computation component 24, a multi-model computation component 26, a parameter computation component 28, and optionally a translation component 29. Data memory 30 stores data used or generated by the software components 24, 26, 28, 29 in the course of the method. The system 10 may be hosted by one or more computing devices such as a server computer 32. One or more network interfaces 33, 34 allow the system to communicate with external devices, such as a client device 36, which may be operated by a customer seeking parameter estimates 16 for a target domain of interest. Source corpus 14 (e.g., in the form of a body of text including sentences, e.g., in paragraph form, or n-gram counts derived therefrom) may be supplied by the customer to the system, e.g., via a wired or wireless link 38, such as a local area network or a wide area network, such as the Internet. Hardware components 18, 22, 30, 33, 34 of the system may be communicatively linked by a data-control bus 40.

Data memory 30 stores domain data 42, 44, 46, 48 for the target domain A and for each of a plurality of comparative domains B, C, D, etc. While three comparative domains are illustrated, it is to be appreciated that data may be provided for any number of comparative domains, such as 2, 3, 4, 5, 6, 8, 10, or more comparative domains, e.g., up to 30 or up to 20 other domains. Some of the data may alternatively be stored on a memory storage device 49 communicatively linked to the system.

Figure 2:
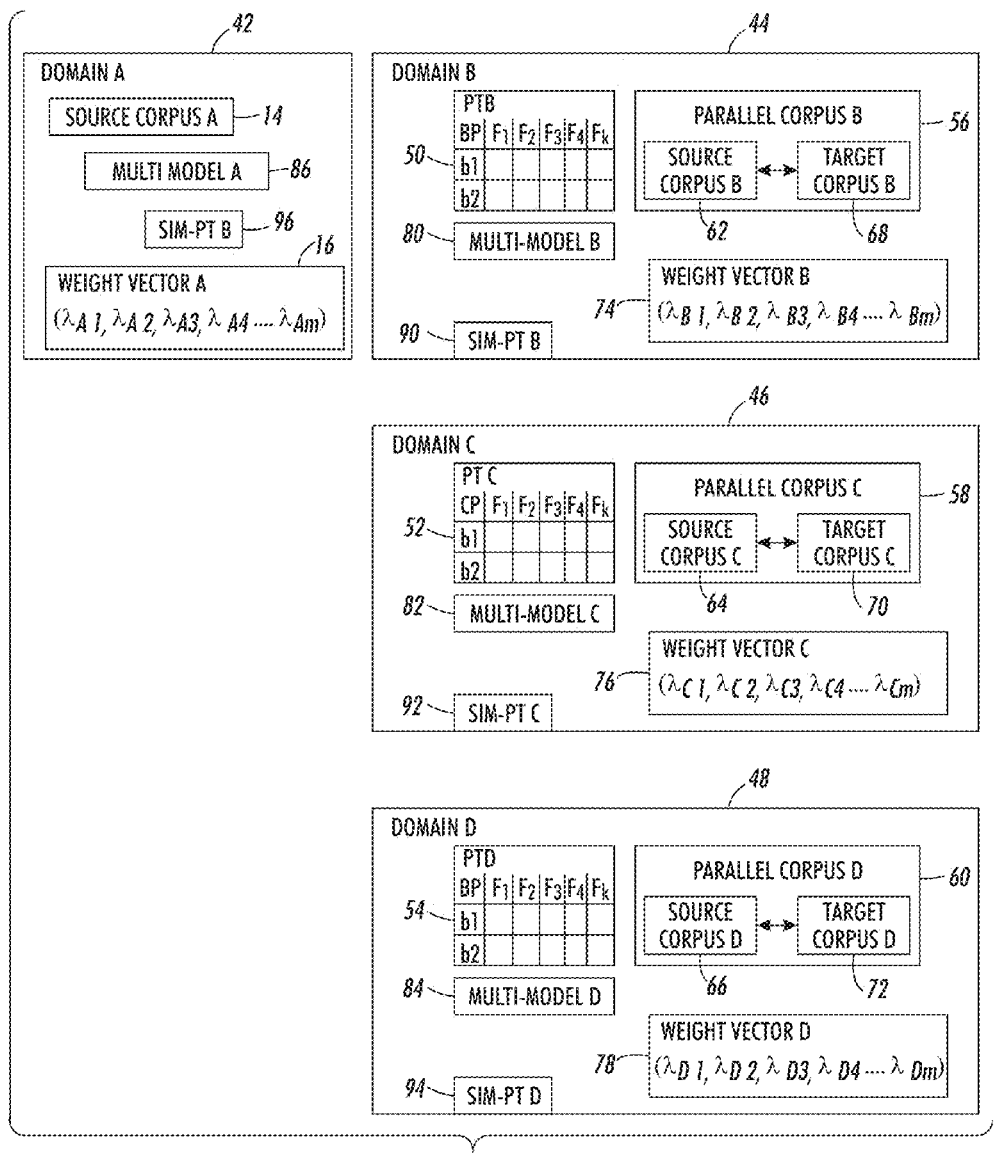
FIG. 2 illustrates data used and generated in the system of FIG. 1.

The domain data 42, 44, 46, 48 is shown in greater detail in FIG. 2. By way of example, for comparative domain B, a phrase table 50 includes a set of biphrases b1, b2, etc. (each including a source language phrase and a target language phrase) and corresponding feature values for features $F_1, F_2, F_3, \ldots F_k$, such as some or all of the features described above. The source and target languages are the same for comparative domain B as for comparative domains C and D (and the target domain A), but because of different sources of training data, the values of the features are not identical in all cases, i.e., at least some feature values are different for each phrase table and in some cases, the biphrases included may be different. In general, the biphrases are the ones most frequently occurring in the parallel training corpus used to generate the phrase table. Domains C and D have respective phrase tables 52, 54. Each comparative domain has a parallel corpus 56, 58, 60 (which may be referred to as a development corpus) that includes source and target text strings derived from text in the respective domain that are determined to be translations of each other, in at least the source to target language direction. The development corpus is generally a different (or smaller) corpus from the training corpus that is conventionally used to generate the phrase table, but need not be. Each development corpus 56, 58, 60 includes a respective source corpus 62, 64, 66, comprising the source text, and a target corpus 68, 70, 72 comprising the target text. Each development corpus 56, 58, 60 can be used to learn an optimal set of parameters 74, 76, 78 for the scoring function for the respective comparative domain, given the domain phrase table.

The similarity computation component 24 is configured for computing a measure of similarity between a source corpus of one domain and a phrase table by comparing n-grams present in the source corpus with the biphrases in the phrase table, specifically, the source language phrases (of length n) occurring in the phrase table biphrases. An n-gram is a text sequence consisting of n tokens, where n is a fixed number, such as 1, 2, 3, or 4. The phrase table being compared may be the phrase table of another domain or may be a multi-model which is a weighted combination of two or more of the phrase tables. For example, in the case of comparative domain B, the similarity computation component 24 computes a measure of similarity between at least a portion of the source corpus 62 (or a different source corpus for that domain) and the phrase tables 52, 54 of domains C and D to generate two domain similarity measures Sim B→C and Sim B→D. Likewise, for domain C, a similarity measure is computed between the source corpus 64 and the phase tables 50 and 54 to generate two domain similarity measures Sim C→B and Sim C→D, and for domain D, a similarity is computed between the source corpus 66 and the phase tables 50 and 52 to generate two domain similarity measures Sim D→B and Sim D→C.

The exemplary similarity measure also allows a measure of similarity to be made between different domains when there is only a source corpus 14 and no preexisting phrase table for that corpus, as is the case for target domain A. Specifically, a similarity measure can be computed between the source corpus 14 and the phase tables 50, 52 and 54 to generate three similarity measures Sim A→B, Sim A→C, and Sim A→D.

The similarity measure computed may be that defined in above-mentioned copending application Ser. No. 14/252,194, incorporated by reference. In particular the similarity measure between a source corpus s and a phrase table pt, referred to as the SIM-PT score, may be of the form shown in Equation (3):

$$SIM - PT(PT, S) = \left( \prod_{n=p}^{n=q} \frac{\text{match}(n \mid pt, s)}{\text{total}(n \mid s)} \right)^{\frac{1}{r}} \quad (3)$$

where match(n|pt,s) is the count of n-grams of order n in a source corpus s that exist in the source side of a given phrase table pt, total(n|s) is the number of n-grams of order n in the source corpus, $\pi_{n=p}^{n=q}$ is the product of the values of $$\frac{\text{match}(n \mid pt, s)}{\text{total}(n \mid s)}$$

computed for each value of n, p is a first value of n, q is a second value of n higher than p, and r is the total number of values of n used to compute the SIM-PT score.

The values of n that are selected to compute the SIM-PT score are generally less than or equal to the largest source side strings found in the phrase tables. For example, p may be 1 or 2 and q may be from 3-10, such as up to 7, e.g., 4. r may be at least 2, such as at least 3 or at least 4. It is also contemplated that some values of n may be omitted. The same values of p, q and r are used in each case. When p is 1 and q is 4, Equation (3) corresponds to Equation (4).

$$SIM - PT(PT, S) = \left( \prod_{n=1}^{4} \frac{\text{match}(n \mid pt, s)}{\text{total}(n \mid s)} \right)^{\frac{1}{4}} \quad (4)$$

To compute match(n|pt,s), the source corpus is effective traversed with a sliding window of size n and for each instance of an n-gram that is present in the source side of the phrase table, the value of match(n|pt,s), is incremented. Thus, for example, in the simplified case when n=2, the source corpus 62 consists solely of "to be or not to be" and the phrase table 52 includes the 2-gram source side phrases "to be" and "not to" in biphrases b1, b2, the count match (n|pt,s) would be 3. Assuming that p is 2 and q is 3 and that the phrase table 52 includes one 3-gram, "or not to", the SIM-PT score would be $$\left( \frac{3}{5} + \frac{1}{4} \right)^{\frac{1}{2}} = 0.85^{\frac{1}{2}} = 0.922$$

since the total number of 2-grams in the source corpus is 5 and the total number of 3-grams in the source corpus is 4. This is only a simplified example, since the source corpus 14 may include at least 50, or at least 100, or at least 1000 n-grams of each size n and each phrase table may include 10,000 or more biphrases, such as up to 1 million biphrases.

In other embodiments, each type of n-gram is counted only once. Thus, in the example above, the count of match (n|pt, s) when n=2 would be 2.

In one embodiment, the counts match(n|pt,s) for each of the phrase tables being compared can be computed simultaneously by encoding all of the phrase tables being compared as a finite state transducer (FST).

The multi-model model computation component 26 generates a multi-model (i.e., a mixture model) of two or more phrase tables by weighting the feature values of the biphrases with mixing coefficients that are based on the computed domain similarity scores. For example, a multi-model 80 is computed for comparative domain B based on the phrase tables 52 and 54 of other domains C and D. Similarly, a multi-model 82 is generated for domain C based on phrase tables 50 and 54. A multi-model 84 is computed for domain D based on the phrase tables 52 and 54 of other domains B and C, etc.

In cases where there are a large number of phrase tables being compared, fewer than all phrase tables may be used to compute a mixture model. For example, the v phrase tables with the highest similarity scores may be used, where v may be, for example, from 3-7, and/or only those phrase tables which exceed a threshold similarity score may be used.

The mixture model computation component 26 may compute each multi-model as a weighted linear combination of the respective phrase tables where the weights are a function of the respective domain similarity scores. In one embodiment, the domain similarity scores are normalized so that all of the scores sum to 1. For, example, if the domain similarity measures, e.g., SIM-PT scores, computed for domain B by comparing the source text 62 with phrase tables 52 and 54 are 0.922 and 0.354 respectively, normalized weights of 0.723 and 0.277 may be applied to the feature values of the phrase tables 52, 54, respectively, and the weighted values summed to generate multi-model 80. Thus, the weights give more emphasis in the multi-model to the phrase tables of those comparative domains for which the domain similarity measure is highest.

A multi-model 86 can similarly be created for domain A, based on domain similarity scores between the source corpus 14 and phrase tables 50, 52 and 54 of comparative domains B, C, and D (or a subset of the comparative domains B, C, D, etc. that have a higher similarity score).

Given the multi-models 80, 82, 84, 86, a further similarity measure 90, 92, 94, 96 can be computed between the source corpus 62, 64, 66, 14, and the respective multi-model for that domain. These similarity measures are referred to as multi-model similarity measures and may be computed in the same manner as for the domain similarity measures described above. For example, in the case of target domain A, a multi-model similarity measure may be a SIM-PT score, SIM-PT A 96, which is computed between source corpus 14 and multi-model A 86. Similarly, for comparative domains B, C, and D, etc., respective SIM-PT scores SIM-PT B, SIM-PT C, and SIM-PT D 90, 92, 94 can be computed.

Given the comparative domain parameter vectors 74, 76, and 78 and their corresponding multi-model similarity measures 90, 92, and 94, the parameter computation component 28 generates parameters, such as a vector of weights 16 for the target domain, e.g., of the form $(\lambda_{A1}, \lambda_{A2}, \lambda_{A3}, \lambda_{A4}, \ldots \lambda_{Am})$, one weight for each of the m feature functions in the log linear scoring function 12. In particular, in a parametric method, the parameter computation component 28 attempts to identify a relationship between each value of the weight vectors 74, 76, and 78 and the corresponding multi-model similarity scores 90, 92, and 94. For example multi-model similarity scores 90, 92, and 94 and a respective first of the weights $\lambda_{B1}, \lambda_{C1}, \lambda_{D1}$, are input to a linear regressor which identifies a linear relationship between the similarity scores and weights. Given this relationship, the weight $\lambda_{A1}$ can be estimated given the multi-model similarity score 96. This can be repeated for each of the weights in the set in turn, or a single regressor may be learned for all weights. In a non-parametric method, the parameter computation component 28 identifies the weight vector of the domain with the closest multi-model similarity measure to the measure 96 and uses that as the weight vector 16 of the target domain. This approach may be used when the regression function does not satisfy a threshold correlation. In another embodiment, a combination of different approaches can be used to estimate the parameter estimates 16.

In some embodiments, the system hosts a translation component 29, such as a phrase-based machine translation system based on MOSES, or the like, which uses the log-linear scoring function 12 incorporating the learned weights 16 for translation of new source text in the target domain. The learned multi-model 86 can be used as the phrase table for the target domain, or a new multi-model may be learned using fewer than all the phrase tables 50, 52, 54.

The computer system 10 may include one or more computing devices 32, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 18, 30, 49 may represent any type of non-transitory computer readable medium such as random access memory (RAM), read only memory (ROM), magnetic disk or tape, optical disk, flash memory, or holographic memory. In one embodiment, the memory 18, 30 comprises a combination of random access memory and read only memory. In some embodiments, the processor 22 and memory 18 may be combined in a single chip. The network interface 33 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 22 can be variously embodied, such as by a single-core processor, a dual-core processor (or more generally by a multiple-core processor), a digital processor and cooperating math coprocessor, a digital controller, or the like. The digital processor 22, in addition to controlling the operation of the computer 32, executes instructions stored in memory 18 for performing the method outlined in FIG. 3. Client computing device 36 may be similarly configured to computer 32, with memory and a processor.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 3:
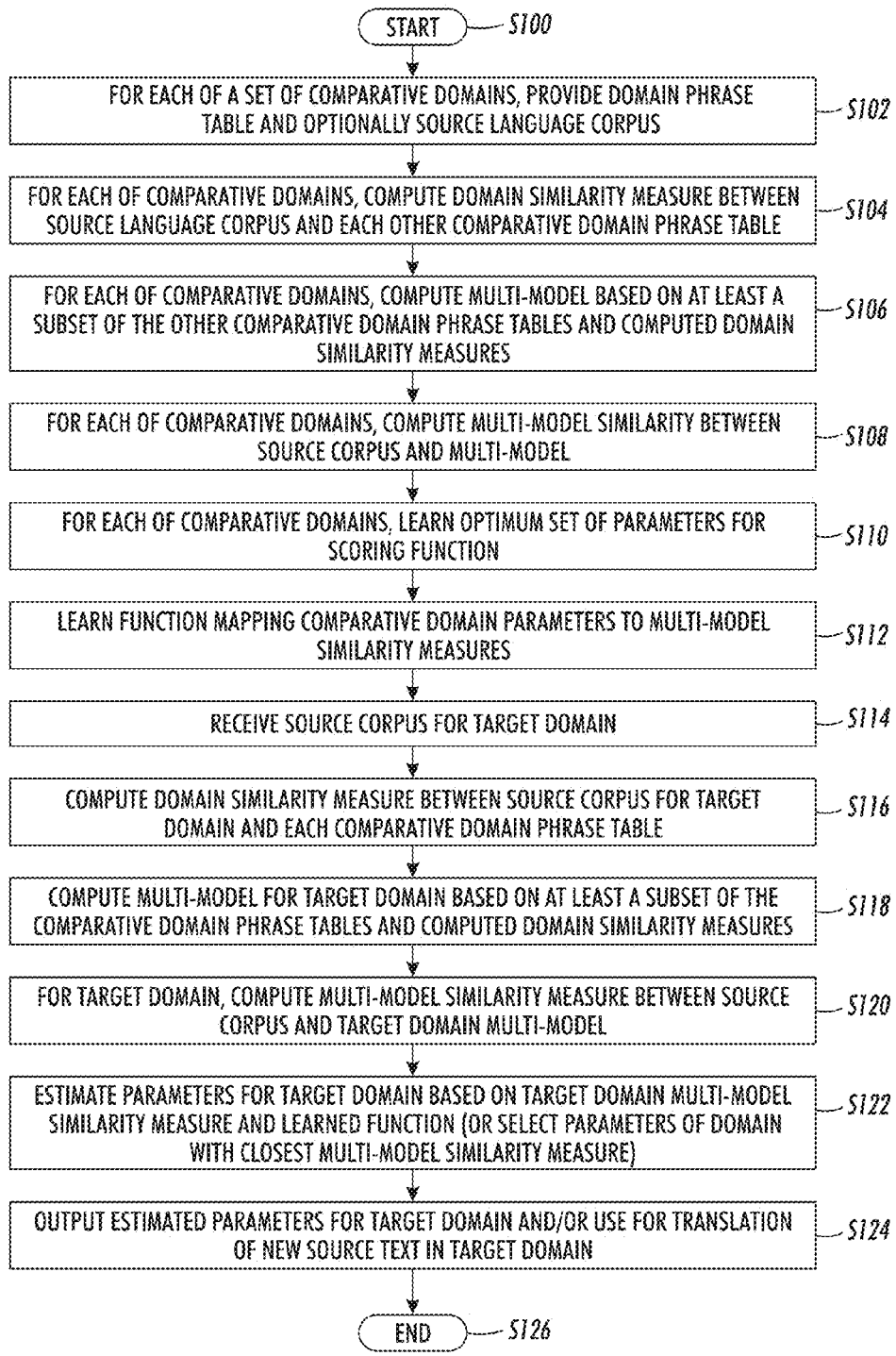
FIG. 3 is a flow chart illustrating a method for estimating parameters for a translation scoring function.

FIG. 3 illustrates a method for estimating parameters 16 for a scoring function 12 which may be performed with the system of FIG. 1. The method begins at S100.

At S102, a phrase table 50, 52, 54 and parallel corpus 56, 58, 60 (or at least a source language corpus 62, 64, 66) is provided for each of a set of comparative domains B, C, D, etc., and may be stored in system memory 30 or accessed form remote memory.

At S104, for each of the comparative domains B, C, D, etc., a domain similarity measure is computed between the respective source language corpus and each other comparative domain phrase table, by the similarity computation component 24.

At S106, for each comparative domain B, C, D, etc., a multi-model 80, 82, 84 is computed, by the multi-model computation component 26, based on at least a subset of the other comparative domain phrase tables, the feature values of each of the other comparative domain phrase tables being weighted as a function of the respective domain similarity measure computed at S104.

At S108, for each comparative domain, a multi-model similarity measure is computed between the source corpus 62, 64, 66 of that domain and the respective domain's multi-model 80, 82, 84, by the similarity computation component 24.

At S110, for each comparative domain, an optimum set of parameters 74, 76, 78 for the respective domain's translation scoring function may be learned by the system, if not already provided. Any suitable learning method may be used for this purpose, for example MIRA (see, Hasler, et al., 2011) which is provided in the Moses toolkit or MERT (see, Och 2003), and an objective function for optimizing the weights, such as the BLEU score (Papineni, et al., 2002). Each comparative domain is thus associated with a set of parameters (weights) for the features of its translation scoring function. In general, each translation scoring function uses exactly the same set of features, although it is contemplated that one or more features may be absent or one or more new features added for one or more of the domains.

At S112, a relationship is evaluated between the comparative domain parameters 74, 76, 78 and their respective multi-model similarity measures 90, 92, 94, by the parameter computation component 28, assuming that there is a relationship of a predefined form. In particular a mapping function, such as a linear regression function, is learned which maps values of one (or more) of the parameters in each set of parameters 74, 76, 78 to the respective multi-model similarity measures 90, 92, 94.

At S114, a source corpus 14 for target domain A is received by the system and may be stored in memory 30. If the customer considers the source corpus 14 to be confidential, the customer may extract all the n-grams for each of the selected values of n and their frequencies from the source corpus and provide that information instead.

At S116, a domain similarity measure is computed, by the similarity computation component 24, between the source corpus 14 for the target domain A and each of the comparative domain phrase tables 50, 52, 54.

At S118, a multi-model 86 is computed for the target domain A, by the multi-model computation component 26, by combining at least a subset of the comparative domain phrase tables 50, 52, 54 with the biphrase features being weighted as a function of the domain similarity measures computed at S116.

At S120, a multi-model similarity measure 96 is computed, by the similarity computation component 24, for the target domain A between the source corpus 14 and the target domain multi-model 86.

At S122, parameters 16 for the target domain are estimated, e.g. computed, by the parameter computation component 28, based on the target domain multi-model similarity measure 96 and the mapping function learned at S112. If a linear relationship is not found at S112 which meets at least a threshold correlation (such as at least ±0.5), the parameter(s) of the comparative domain having the closest multi-model similarity measure may be adopted as the parameter(s) 16.

At S124, the estimated parameters 16 for the target domain A (and optionally also the multi-model 86) may be output from the system 10 and/or used directly in a log linear translation model 12 for translation of new source text in the target domain by the translation component 29 of the system. Exemplary phrase-based statistical machine translation systems which may be used for this purpose are well known. See, for example, the references incorporated by reference above and P. Koehn, et al., "Moses: Open Source Toolkit for Statistical Machine Translation," Proc. 45th Annual Meeting of the Assoc. for Computational Linguistics, Companion Volume Proceedings of the Demo and Poster Sessions, pp. 177-180 (2007). The multi-model 86 computed for the target domain may be used as the phrase table for the translation system in performing the translation.

The method ends at S126.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 32, (for example, an internal hard drive of RAM), or may be separate (for example, an external hard drive operatively connected with the computer 32), or may be separate and accessed via a digital data network such as a local area network (LAN) or the Internet (for example, as a redundant array of inexpensive of independent disks (RAID) or other network server storage that is indirectly accessed by the computer 32, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method for estimating parameters.

As will be appreciated, while the steps of the method may all be computer implemented, in some embodiments, one or more of the steps may be at least partially performed manually.

As will also be appreciated, the steps of the method need not all proceed in the order illustrated and fewer, more, or different steps may be performed.

Further details of the system and method will now be described.

As noted above, the system and method can be used to estimate model parameters in situations where only a source text is available in the relevant domain. The system makes use of previously trained models (phrase tables) for various comparative domains and their parameter estimates, computed on a set of parallel development sets of the different domains. Such resources are available from a variety of external sources or a library of models may have been built for other customers. The method makes use of this information to estimate parameters for a new domain for which the parallel development set is not available. In the examples below, it is demonstrated that the method for tuning the parameters of a log-linear model that does not require an in-domain parallel development corpus achieves results that are comparable to parameter estimation on a parallel development corpus using a conventional method such as MIRA (see, Hasler et al., 2011).

Since the overall quality of translation is determined, in part, by how well optimized the weights of the log-linear combination of various translation features are for a domain of interest, the ability to optimize these weights is thus a valuable part of the method for building a high quality translation system. It is assumed that the optimized log-linear weight vector 16 depends on how far the domain of interest is from the domain of the training corpora which were used to build the phrase tables 50, 52, 54. This means that the weight vector (i.e., parameter estimates) can be modelled as a function of the similarity between the target domain source corpus 14 and the phrase tables built from the training data. The metric, SIM-PT, can be used for efficiently computing similarity between a source corpus and a phrase table. The optimization problem (finding the best weights for a log-linear combination of weight vectors) is now reduced to a problem of learning a function that maps the similarity to the parameter estimates.

In one embodiment, the mapping function is learnt, at S112, using a supervised approach. Each training point in the training data is a pair of <SIM-PT, log-linear weight> for one of the m features taken. For learning this mapping function between the multi-model similarity measure and the parameter estimates, a parametric method or a non-parametric method can be employed. Then, for a monolingual source 14 in a new domain, the SIM-PT can be computed, and then mapped to the appropriate weight vector using one of the methods presented below.

Parametric Method

In this approach, a linear regressor (regression function) of the general form $\lambda_i = a_i x + b_i$ is trained for predicting each of the weights λ in the weight vector, given the multi-model similarity score, SIM-PT, denoted x, between a source corpus and a respective multi-model. The aim is to learn the values of $a_i$ and $b_i$ that optimize the regression coefficient for the mapping function over the training data (the SIM-PT scores 92, 94 96 and corresponding parameter values $(\lambda_i)$ (weights) 74, 76, 78 of the log-linear scoring function for the comparative domains. It may be assumed that each parameter of the log-linear scoring function is independent of the others. Accordingly, in one embodiment, a separate regression function is trained for each of the m parameters. The values of $a_i$ and $b_i$ can be estimated by simple least squares regression. In another embodiment, a multi-task regressor may be trained.

To find the linear relationship, at least three or four training pairs $(\lambda_i, x)$ are input to the linear regressor. The regressor outputs a value of a (the slope) and b (the offset from the origin) of an inferred linear relationship between $\lambda_i$ and x. Where a larger number of training pairs is available, such as at least six or seven pairs, one or more outliers (pairs that do not fit with the rest of the training data) may be excluded from the training data.

While simple linear regression is used in the exemplary embodiment, it is contemplated that other relationships may be considered for mapping the training data in addition or as an alternative to simple linear regression, such as polynomial linear regression, logistic regression, or the like.

In practice, it may be found, however, that for certain parameters, there may be no linear relationship between the multi-model similarity score and one or more of the log linear weights and hence a linear regressor does not fit the training examples. For example, where the correlation coefficient is below a threshold value (such as 0.5), the predicted weights may not be optimal and thus may worsen the translation quality. In such cases, the non-parametric approach may be employed.

Optimal log-linear parameters may not be fully independent, given the multi-model similarity score, since some features can be highly correlated. To account for correlation between parameter weights, a multi-task regressor may be used. One such method uses Lasso (see, Rich Caruana, "Multitask learning," Machine Learning, pp. 41-75 (1997)), an algorithm for which is available at http://scikit-learn.org/. In this technique, several functions corresponding to each parameter are learned jointly considering the correlation between their values observed in the training data. Multi-task Lasso involves a least square loss model trained along with a regularizer and the objective is to minimize the following:

$$\operatorname*{argmin}_{w} \frac{1}{2N} \|SIM - PT \cdot W - \lambda\|_2^2 + \alpha \|W\|_{21} \text{ where } \|W\|_{21} = \Sigma_i \sqrt{\Sigma_j^M w_{ij}^2}$$

Here, N is the number of training samples, λ is the label vector (log linear weights), and $\|W\|_{21}$ is the $l_{21}$ regularizer (see, Yang, et al., "L2,1-norm regularized discriminative feature selection for unsupervised learning," Proc. 22nd Intern'l Joint Conf. on Artificial Intelligence (2) pp. 1589-1594 (2011)). The problem of prediction of log linear weights is thus reduced to prediction of i tasks (each task with M features, here, just the multi-model similarity score, SIM-PT) which are interlinked to each other. Coefficients are calculated using a coordinate descent algorithm in Multi-task Lasso.

Non-Parametric Method

In the non-parametric method, instead of building a mapping function that serves as a predictor for the log-linear weights of the target domain, the comparative domain whose similarity 90, 92, 94 between the respective source corpus to its multi-model 80, 82, 84 is closest to the similarity 96 between the target source corpus 14 and the target domain multi-model 86 is identified. Then, the parameter value(s) of this comparative domain is/are selected as the respective parameter value(s) for the weight vector 16 of the target domain. This is a nearest neighbor approach, where the SIM-PT of a multi-model is calculated on the source sample to be translated, and then, that log-linear weight is chosen from the training data that corresponds to the parameter estimate of another similarity value closest to the SIM-PT. This approach is similar to the approach used in cross-domain tuning (see, Pecina 2012), but unlike that approach, needs no parallel training data for computing similarity.

From a plot where the x-axis is SIM-PT and the y axis is the log linear weight $\lambda_i$ for a feature (f), suppose that the SIM-PT 90 on the target domain mixture model 86 is 20, then the training data point (say x'y') whose x-axis projection (x': SIM-PT) is closest to 20 will be chosen and y' will be assigned as the log linear weight for the feature f.

Without intending to limit the scope of the exemplary embodiment, the following examples demonstrate the applicability of the method.

EXAMPLES

Datasets

The following datasets were used to evaluate the method:

A set of 12 publicly available corpora and 1 proprietary corpus were obtained. Statistics of these datasets are noted in Table 1.

1. Commoncrawl: web-mined parallel text from the Common Crawl, a public regularly updated 81-terabyte snapshot of the public internet hosted on Amazon's Elastic Cloud (EC2) service. This uncovered a large amount of parallel text in dozens of language pairs across a variety of domains and genres. See, Jason R. Smith, et al., "Dirt cheap web-scale parallel text from the common crawl," Proc. 51st Annual Meeting of the ACL (Volume 1: Long Papers), pages 1374-1383 (August 2013).

2. News Commentary (News Comm.): test data included news stories from online sources in Czech, French, Spanish, English, German, and Russian. See, Ondřej Bojar, et al., "Findings of the 2013 Workshop on Statistical Machine Translation," Proc. 8th Workshop on Statistical Machine Translation, ACL, pp. 1-44 (August 2013).

3. TEDTalks corpus: a collection of transcribed and translated talks based on original content in English, published by the TED Conference, and translated into a variety of languages. This corpus was released as a part of IWSLT evaluation campaign (see, Mauro Cettolo, et al., "WIT³: Web inventory of transcribed and translated talks," Proc. 16th Conf. of the European Association for Machine Translation (EAMT), pp. 261-268 (May 2012) (Cettolo et al., 2012).

4. ECB: a corpus of data from the European Central Bank, containing over 30 million parallel translation units in 19 European languages.

5. EMEA: a parallel corpus generated from PDF documents from the European Medicines Agency.

6. EUconst: a parallel corpus collected from the European Constitution in 21 languages.

7. OpenOffice: A collection of documents from the openoffice website in 8 languages.

8. OpenSubtitles 2011 (OpenSubs): contains data from over 50 languages with altogether over 8 billion words.

9. PHP: a parallel corpus originally extracted from the PHP programming manual. The original documents are written in English and have been partly translated into 21 languages.

10. UN: corpora of translated UN documents in six languages.

11. KDE4: a parallel corpus of KDE4 localization files in 92 languages.

12. Private corpus (P1).

The Commoncrawl and News Commentary corpora were provided in the 2013 shared translation task organized in the Workshop on Statistical Machine Translation (WMT 2013). The ECB, EMEA, EUconst, OpenOffice, OpenSubs, PHP and UN corpora were provided as a part of the OPUS parallel corpora (see, Jörg Tiedemann, "Parallel data, tools and interfaces in OPUS," Proc. 8th Intern'l Conf. on Language Resources and Evaluation (LREC'12), ELRA, pp. 2214-2218 (May 2012) and http://opus.lingfil.uu.se/).

The parallel corpora from OPUS were randomly split into training, development, and test sets. Commoncrawl, News Commentary, and TED datasets were used as they were provided in the evaluation campaigns. Out of 13 different domain datasets, 4 datasets were selected randomly: Commoncrawl, KDE4, TED and UN (in bold in Table 1), to test the methods.

TABLE 1

Statistics of parallel sets (No. of source tokens)

| Corpus | Training | Development | Test |
|---|---|---|---|
| Commoncrawl | 78M | 12.4K | 12.6K |
| ECB | 4.7M | 13.9K | 14K |
| EMEA | 13.8M | 14K | 15.7K |
| EUconst | 133K | 8K | 8.4K |
| Europarl | 52.8M | 13.5K | 13.5K |
| P1 | 5M | 35K | 14.5K |
| KDE4 | 1.5M | 12.8K | 5.8K |
| News Comm. | 4M | 12.7K | 65K |
| OpenOffice | 400K | 5.4K | 5.6K |
| OpenSubs | 156M | 16K | 15.7K |
| PHP | 314K | 3.5K | 4K |
| TED | 2.65M | 21K | 14.6K |
| UN | 1.92M | 21K | 21K |

For estimating the parameters, training data containing the tuples of <SIM-PT, log-linear-weight> (x, $\lambda_i$) was generated. The parameter estimation was evaluated on the Commoncrawl, KDE4, TED and UN datasets. For obtaining evaluation results on, for example, UN, UN was used as the target domain and the rest of the resources were used as comparative domains for generating the training data.

Figure 4:
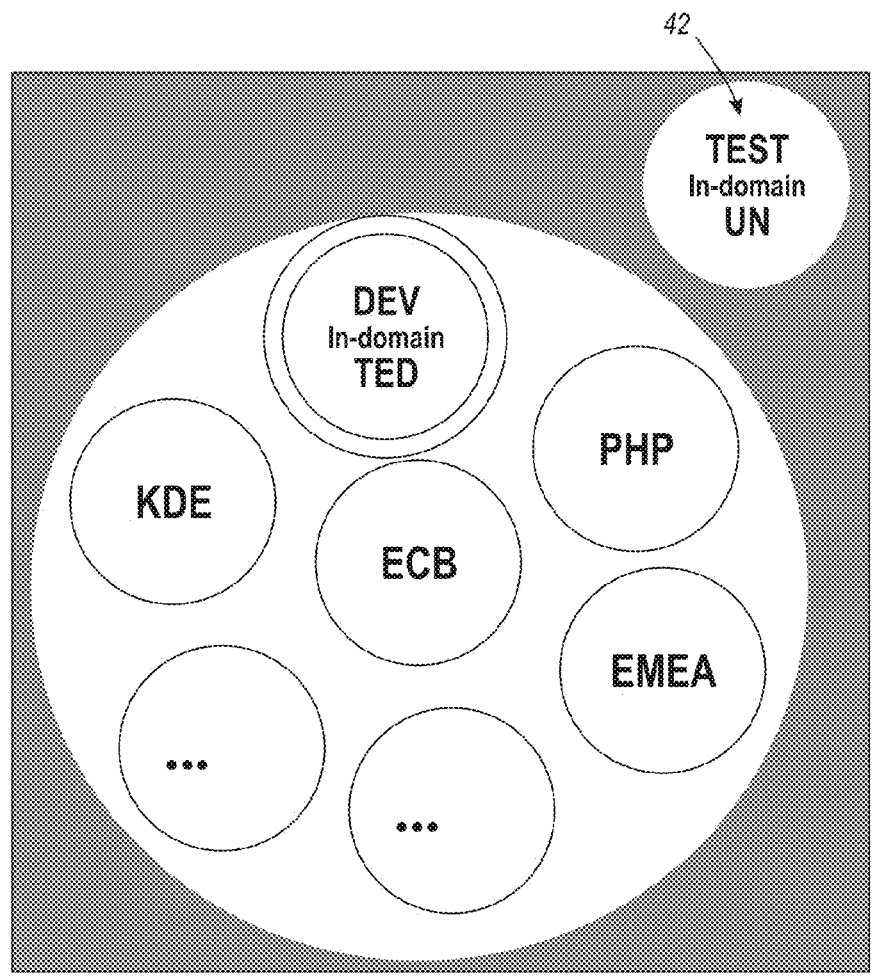
FIG. 4 illustrates cross domain tuning setup in an evaluation of the method.

The Venn diagram shown in FIG. 4 illustrates the experimental cross domain tuning setup using one of four domains as the test (target) domain 42 (in this case, UN) whose parallel development set is assumed not to be available, and which is called setup-UN. The training data tuples obtained from the 12 remaining datasets are used to estimate parameters for the UN domain. From these 12 datasets, each dataset is considered as an in-domain development set 44 in turns and the phrase tables trained from the remaining 11 datasets are considered as out-domain phrase tables for computing the similarity and multi-model for domain 44. In FIG. 4, for example, the development set 56 from the TED domain is taken as the development set for building a multi-model 80 using the rest (excluding TED and UN). This multi-model is built by a weighted linear combination of the out-domain phrase tables (11 phrase tables). The parameters of the corresponding weight vector 74 were tuned on the in-domain development set 56 using the MIRA technique. Simultaneously, the SIM-PT of the linear interpolated multi-model was computed on the source side 62 of the in-domain development set (i.e., TED). This provides one of the tuples of SIM-PT 90 and the set 74 of log-linear weights, which is the training data for learning the linear regression function. The log-linear weights used were for the standard phrase-based translation features, such as forward phrase translation probability, backward phrase translation probability and the like. A set of 5 translation model (TM) features, 6 reordering model (RM) features, and 11 language model (LM) features (one for each of the domains) was used.

Four sets of experiments were conducted (one each for the four datasets considered for testing), and for each set of experiments, 12 training data points were used for learning the regression function. The final evaluation was performed by measuring the BLEU translation score (see, Papineni, et al.) obtained on the test set using the predicted parameter estimates and the test data.

For prediction of parameters for a new domain, the multi-model similarity score SIM-PT of the sample source corpus 14 (of UN in the example) is measured with the multi-model 86 built on all the phrase tables (all the rest of the 12 datasets including the TED one) and then the learned linear regression function is applied. In the experiments, both the linear regressor and the nearest neighbor methods were used to estimate the parameters based on the training data obtained using the 12 domains.

Correlation Analysis

Figure 5:
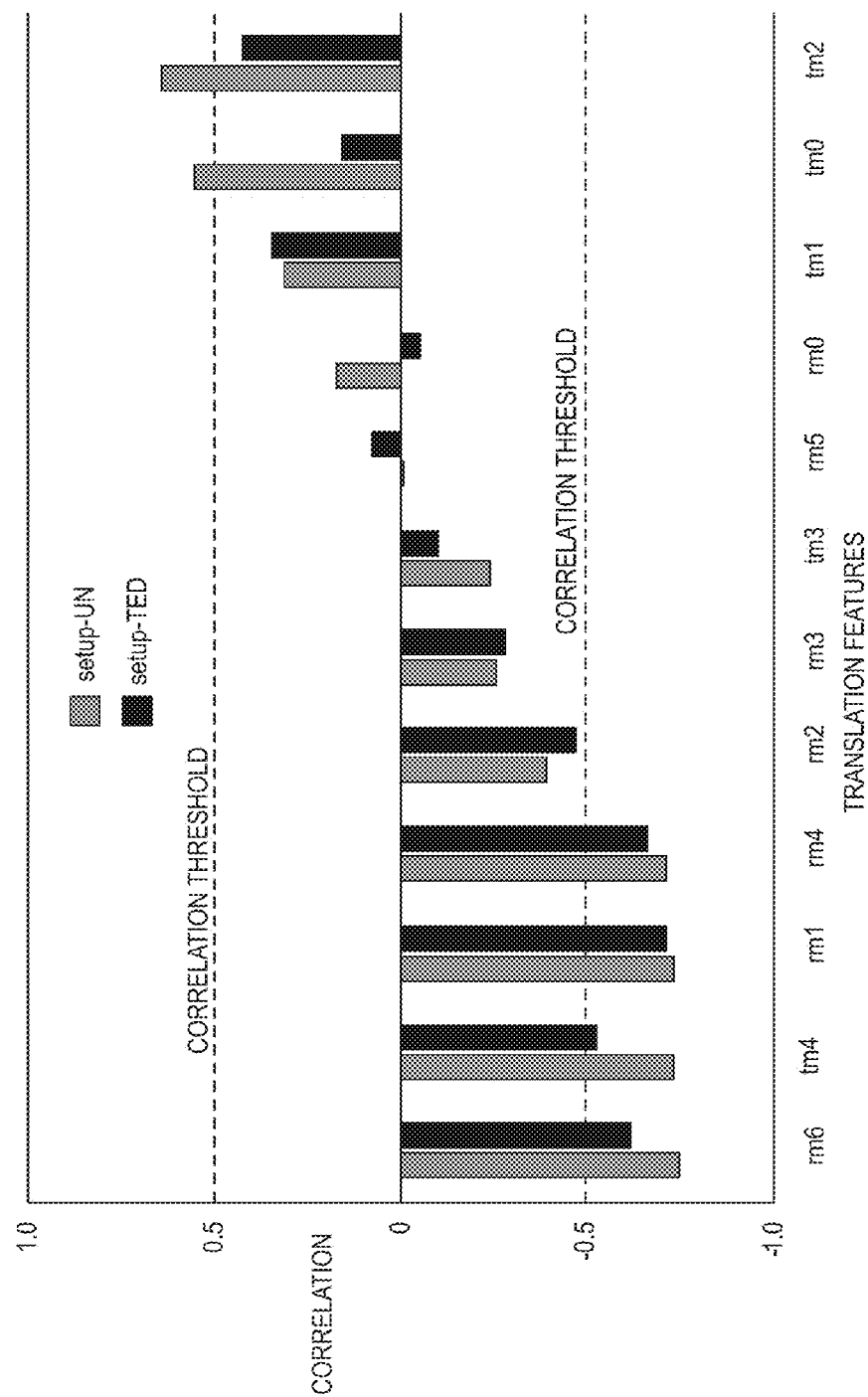
FIG. 5 is a graph showing the correlation coefficient for log linear weights for each of a set of translation features using UN and TED data sets as the target domain.

The correlation between the multi-model similarity scores (SIM-PT) and the various weights in the training data was evaluated. If there is good correlation between SIM-PT and a particular parameter type, then the linear regressor is expected to fit well and then predict an accurate parameter value for a new domain. However, if this is not the case, then it indicates a more complex relationship between SIM-PT and the parameter value, suggesting that the non-parametric approach is more appropriate. For computing the correlation, Pearson's Correlation Coefficient was used in one experiment. FIG. 5 shows the Pearson correlation coefficients computed between the feature weights and the SIM-PT scores. tm is used to denote the translation model features, and rm to denote the reordering model features. It can be seen that there is either a strong positive correlation or a strong negative correlation for many of the features for both the UN and TED domains. This indicates that parameters for a new test domain can be estimated with good reliability for these highly-positively or negatively correlated features. It can also be observed that the correlation coefficient also varies based on the mixture of the training models. For example, the correlation is much higher in the training data that excluded UN (setup-UN) than the one that excluded TED (setup-TED). Hence, it is expected that the linear regressor will work more effectively in setup-UN, while the nearest neighbor (non-parametric) method may be more effective in setup-TED. This is also demonstrated in Table 2. So, in cases where the correlation is low, the non-parametric method can be used. In Table 2, it can also be seen that TM features tm0 and tm2, which have been shown to be the two most useful features amongst all SMT features in one study, in terms of their effect on the translation quality (see, Lopez and Resnik, "Word-based alignment, phrase-based translation: What's the link?" Proc. AMTA, pp. 90-99 (2006)), have a high correlation in setup-UN.

Machine Translation Systems

The SMT systems used in the experiments were built using the Moses toolkit (Koehn et al., 2007). For automatically aligning the parallel corpora, MGIZA was used (see, Gao and Vogel, "Parallel implementations of word alignment tool," Software Engineering, Testing, and Quality Assurance for Natural Language Processing (SETQA-NLP '08), pp. 49-57 (2008)). Aligned training data in each domain was then used to create the corresponding domain translation models and lexical reordering models. 5-gm language models were created for each domain using SRILM (Andreas Stolcke, "Srilm—an extensible language modeling toolkit," Proc. ICSLP, pp. 901-904 (2002)) with improved Kneser-Ney smoothing on the target side of the training parallel corpora (see, Chen and Goodman, "An empirical study of smoothing techniques for language modeling," Computer Speech and Language, 4(13):359-393 (1999)). The log linear weights for the systems were optimized using MIRA (Hasler et al., 2011) which is provided in the Moses toolkit. Performance of the systems are measured in terms of BLEU score, computed using the MultEval script (mteval-v13.pl). One UpperBound system was built where only the in-domain training data was used, as opposed to the multi-model of out-domain datasets, for comparison purposes. This system shows the value of having in-domain training data for leaning the weights in SMT. Three oracle systems were trained on out-domain training corpora and the weights tuned on in-domain development data (in this case these were for domains chosen to test on: UN, TED, CommonCrawl, and KDE4), thus three oracle systems were created for each of the in-domain test sets. Experiments where the weights were uniform, i.e. flat weights, were also performed, however, the results were poor and were not comparable to any of the 2 3. These comparative systems were compared against systems S1 and S2 formed in accordance with the exemplary method, whose log-linear weights are computed using the parametric and non-parametric approaches, respectively. A total of 5 TM features, 6 RM features, and 12 LM features (one for each of the comparative domains) were predicted for the target domain. Note the change to 12 LMs because now the models are trained on 12 domains, i.e., excluding the one which is used as the target domain.

1. UpperBound: In-domain model tuned and tested on an in-domain development corpus.

Oracle-1: Linear combination of out-domain translation models (mixing coefficients are the normalized SIM-PT scores), log-linear combination of reordering models, tuned and tested on in-domain.

Oracle-2: Linear combination of out-domain models (mixing coefficients are normalized SIM-PT scores) tuned and tested on in-domain.

Oracle-3: Linear combination of out-domain translation models (mixing coefficients from perplexity minimization (see, Rico Sennrich, "Perplexity minimization for translation model domain adaptation in statistical machine translation," Proc. 13th Conf. of the European Chapter of the Association for Computational Linguistics (EACL '12), ACL, pp. 539-549 (2012)), linear combination of reordering models (same as Oracle-2) tuned and tested on in-domain.

S1: Linear combination of out-domain (comparative domain) models (mixing coefficients are normalized SIM-PT scores), all log linear weights were computed using the parametric method and tested on in-domain (target data).

S2: Linear combination of out-domain models (mixing coefficients are normalized SIM-PT scores), all log linear weights were computed using the non-parametric method and tested on in-domain (target data).

Results

Table 3 shows the performance of the systems described above for each of the four experiments setups. As noted above, each of the experimental setups has a fixed test (target) domain, chosen from the four domains: UN, Commoncrawl, TED and KDE4.

TABLE 3

BLEU scores of different systems

| System | UN | TED | Commoncrawl | KDE |
|---|---|---|---|---|
| UpperBound | 67.87 | 29.98 | 26.62 | 35.82 |
| Oracle-1 | 41.53 | 31.48 | 18.00 | 27.11 |
| Oracle-2 | 44.14 | 31.20 | 17.43 | 24.25 |
| Oracle-3 | 43.56 | 31.36 | 17.54 | 24.72 |
| S1 (parametric) | 39.77 | 12.62 | 16.35 | 5.55 |
| S2 (non-parametric) | 37.240 | 28.47 | 14.39 | 12.9 |

From Table 2, the following observations can be made:

1. The exemplary MT systems which do not assume any availability of in-domain parallel dataset perform only slightly worse (except in the setup-KDE) than the Oracle systems that use in-domain parallel data. This is a significant result which indicates that a good system can be built for a new domain, even in the absence of the parallel data in the domain of interest. In the setup-KDE, it is possible that the poor results were because this domain is substantially different from all the other domains used for training, containing very specific terminology. This is demonstrated in Table 3, where the similarity of the sample text with the combination of resources from the rest of the domains is presented. In Table 3, it can see that the cosine similarity of the sample from KDE with the concatenated text from other domains is very low compared to the cosine similarities of other domains. A similar observation is made in the SIM-PT of the sample text from KDE.

TABLE 3

SIM-PT and cosine similarity scores in different setups

| Setup | SIM-PT | Cosine Similarity |
|---|---|---|
| UN | 47.7 | 0.74 |
| TED | 50.97 | 0.94 |
| CommonCrawl | 31.70 | 0.87 |
| KDE4 | 27.64 | 0.55 |

2. In setup-UN and setup-Commoncrawl, the linear regression worked very well. However, in the case of setup-TED, it did not perform as well, while the non-parametric algorithm worked better. This may be due to the low correlation between SIM-PT and the parameter types. The appropriate estimation approach can thus be selected based on the correlation values in the training data.

3. The results with the comparative system, UpperBound, are the best, which indicates that where both the in-domain parallel data for training the phrase table and for parameter estimation are available, the best system is produced. However, having a training data in the domain of interest is not always available, for example, where a translation system tailored to the customer's domain needs to be delivered as quickly as possible.

In further experiments, a set of SMT systems were built in which language models were combined with linear interpolation. Linear interpolation of 12 LMs results in one single large LM, thus, one weight. So, a total of 14 weights had to be optimized or predicted. The systems using linear interpolated LM (mixing coefficients are normalized BLEU-PT scores) are referred to as def-SIM-PT-all, mira-SIM-PT-all, gen-reg-SIM-PT-all, gen-mtl-SIM-PT-all and gen-nn-SIM-PT-all. mtl refers to multi-task learning and reg to regression. mira-SIM-PT-all was compared with mira-SIM-PT-tm-rm-perp-lm where mixing coefficients for LM interpolation were calculated by a standard LM perplexity minimization method over a target side of development set. def-SIM-PT-all uses default weights from the Moses decoder. These can be compared with the in-dom-train system where only in-domain training data is taken into account. In Near.Neigh (nn), a Nearest Neighbor predictor was used for optimizing weights. As the exemplary method is designed for identifying only a subset of all the models closer to the source sample to be taken into account for providing a quick adaptation, the top five domains related to the source sample were selected and the respective models interpolated. These are referred to as top 5-systems.

Three oracle systems were trained on out-domain training corpus and tuned on in-domain development data (for UN, TED, CommonCrawl and KDE4), thus 4 systems for each of the in-domain test sets.

Table 4 shows the configuration of different systems. Each system's training domain and development set domain along with the optimizer/predictor is noted. LL represents log linear interpolation of models while L represents linear interpolation. The mixing coefficients for linear interpolation are calculated by normalizing SIM-PT scores unless mentioned otherwise.

TABLE 4

| System | Domain Train | Dev | Param. Est. | Linear Interpolation | | |
|---|---|---|---|---|---|---|
| | | | | TM (coeff.) | RM (coeff.) | LM (coeff.) |
| in-dom-train | In | In | mira | N.A | N.A | N.A |
| mira-SIM-PT-tm-rm | Out | In | mira | L | L | LL |
| mira-perp-tm-SIM-PT-rm | Out | In | mira | L (Perp.Min) | L | LL |
| mira-SIM-PT-tm-rm-perp-lm | Out | In | mira | L | L | L (LMPerp.Min.) |
| mira-SIM-PT-all | Out | In | mira | L | L | L |
| def-SIM-PT-all | Out | LL | default weights | L | L | L |
| gen-reg-SIM-PT-all | Out | LL | regression | L | L | L |
| gen-mtl-SIM-PT-all | Out | LL | multi-task | L | L | L |
| gen-nn-SIM-PT-all | Out | LL | Near.Neigh | L | L | L |

TABLE 4-continued

| | | | Linear Interpolation | | |
| | Domain | Param. | TM | RM | LM |
| System | Train Dev | Est. | (coeff.) | (coeff.) | (coeff.) |
|---|---|---|---|---|---|
| top5-reg-SIM-PT-all | Out LL | regression | L | L | L |
| top5-mtl-SIM-PT-all | Out LL | multi-task | L | L | L |
| top5-nn-SIM-PT-all | Out LL | Near.Neigh | L | L | L |

TABLE 5 shows results (BLEU-scores) of the systems that use an in-domain parallel data. As expected, when an in-domain corpus is used both for training as well as for optimizing the log-linear parameters, the performance is much higher than those systems that do not use in-domain parallel corpus for training. It can also be observed that the use of normalized BLEU-PT for computing mixing coefficients gives comparable performance to using Cross-Entropy. The primary advantage in using BLEU-PT is that it can be computed much faster than Cross-Entropy as discussed above. Normalized BLEU-PT scores as mixing coefficients performs on a par with mixing coefficients retrieved by a standard perplexity minimization method. BLEU-PT can be used for LM interpolation in cases where target side in-domain text is not available.

TABLE 5

Comparison of In-Domain system versus established Oracles in different setups

| System | UN | TED | CC | KDE |
|---|---|---|---|---|
| in-dom-train | 67.87 | 29.98 | 26.62 | 35.82 |
| mira-SIM-PT-tm-rm | 44.14 | 31.20 | 17.43 | 24.25 |
| mira-perp-tm-SIM-PT-rm | 43.56 | 31.36 | 17.54 | 24.72 |
| mira-SIM-PT-tm-rm-perp-lm | 43.96 | 31.85 | 18.45 | 23.39 |
| mira-SIM-PT-all | 43.66 | 32.04 | 18.44 | 23.09 |

Table 6 illustrates the impact of phrase table retrieval on the performance of the multi-model (BLEU score). All the systems presented in this table use SIM-PT for computing mixing coefficients, while the weights are computed using the three different techniques discussed above. It can be seen that in the case of regression, the phrase table retrieval also results in a better MT performance. In the other two cases, the results are comparable. This indicates that retrieval helps in building smaller sized multi-models while being more accurate on average. Phrase table retrieval thus becomes particularly useful when a multi-model needs to be built from a library of dozens of pre-trained phrase tables of various domains.

TABLE 6

Comparing the generic systems (gen-) with domain specific systems (top5-) in all setups

| System | UN | TED | CC | KDE |
|---|---|---|---|---|
| gen-reg-SIM-PT-all | 43.27 | 32.18 | 17.95 | 21.05 |
| top5-reg-SIM-PT-all | 43.39 | 32.31 | 18.10 | 21.54 |
| gen-mtl-SIM-PT-all | 43.35 | 32.61 | 18.26 | 20.67 |
| top5-mtl-SIM-PT-all | 43.56 | 32.60 | 18.14 | 20.91 |
| gen-nn-SIM-PT-all | 42.73 | 31.04 | 18.24 | 21.85 |
| top5-nn-SIM-PT-all | 42.96 | 30.89 | 17.79 | 22.24 |

Table 7 compares the approach of computing log-linear weights (in the absence of in-domain development set) to the existing weight optimization technique MIRA (which requires an in-domain development set). As a baseline, uniform weights are given to all the parameters. It can be see that the present method performs significantly better than the default weights baseline (an improvement of more than 1.5 BLEU score on an average across 4 domains). Among the three approaches for computing weights, the method that uses multi-task lasso performed best (except in setup-KDE where the non-parametric method performs best), along the expected lines as multi-task lasso considers the correlation between various features. When compared to MIRA, the methods resulted in an average drop of as little as 0.5 BLEU points across 4 domains (see Table 7). This result indicates that one can build a good system for a domain even in the absence of the parallel data in the domain of interest. In the table, * and ** denote significantly better results in comparison with the def-SIM-PT-all system with p-value <0.0001 and <0.05 respectively.

TABLE 7

Comparing the baseline system (def-SIM-PT-all) and Oracle (mira-SIM-PT-all) with domain specific multi-model systems trained on top5 domains

| System | UN | TED | CC | KDE |
|---|---|---|---|---|
| def-SIM-PT-all | 42.03 | 30.82 | 17.97 | 19.66 |
| mira-SIM-PT-all | 43.66 | 32.04 | 18.44 | 23.09 |
| top5-reg-SIM-PT-all | 43.39* | 32.31* | 18.10 | 21.54* |
| top5-mtl-SIM-PT-all | 43.56* | 32.60* | 18.14 | 20.91* |
| top5-nn-SIM-PT-all | 42.96* | 30.89** | 17.79 | 22.24* |

The results indicate that a machine translation system tailored to a customer's domain can be developed using only a sample monolingual dataset provided by the customer, without the need for the customer to provide the translations or for the system provider to do so. A good quality machine translation system can be generated with only the monolingual source corpus by leveraging a previously-trained library of phrase tables. This can postpone the task of generating target-domain parallel data to a later date, for example, if the customer finds that there is much more translation to be done, warranting the expense of a conventionally-developed system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for estimating parameters for features of a translation scoring function and for scoring candidate translations in a target domain comprising:
receiving a monolingual source corpus for a target domain and deriving n-gram counts from the monolingual source corpus or receiving n-gram counts derived only from the monolingual source corpus, the monolingual source corpus comprising sentences in a source language;
generating a multi-model for the target domain based on a phrase table for each of a set of comparative domains and a measure of similarity between the n-gram counts derived only from the source corpus for the target domain and the phrase tables for the comparative domains, each of the phrase tables storing a value for each of a set of features for each of a set of biphrases, the generated target domain multi-model being a weighted combination of two or more of the phrase tables for the comparative domains;
for the target domain, computing a measure of similarity between the monolingual source corpus and the target domain multi-model;
for each of a plurality of the comparative domains, computing a measure of similarity between a source corpus for the comparative domain and a respective comparative domain multi-model that is derived from phrase tables for others of the set of the comparative domains, each of the plurality of comparative domains being associated with parameters for at least some of the features of the translation scoring function;
estimating the parameters of the translation scoring function for the target domain based on the computed measure of similarity between the source corpus and the target domain multi-model, the computed measures of similarity for the comparative domains, and the parameters for the scoring function for the comparative domains; and
with a statistical machine translation component, scoring a translation with the translation scoring function,
wherein the generating of the target domain multi-model, computing the measure of similarity between the source corpus and the target domain multi-model, computing the measure of similarity between a source corpus for the comparative domains and the respective comparative domain multi-models, and the estimating the parameters for the translation scoring function are performed with a computer processor.

2. The method of claim 1, wherein the estimating of the parameters comprises:
learning a function which maps values of at least one parameter of the translation scoring function to the computed measures of similarity for the comparative domains; and
where the learned function indicates a correlation between the at least one parameter and the computed measures of similarity, estimating the at least one parameter for the target domain based on the learned function.

3. The method of claim 2, where the learned function is a linear regression function.

4. The method of claim 2, wherein when a predefined correlation is not found, estimating the at least one parameter for the translation scoring function based on the corresponding at least one parameter of one of the comparative domains that has a computed similarity with the respective comparative domain multi-model which is closest to the computed similarity with the target domain multi-model.

5. The method of claim 1, wherein each similarity measure is computed as a function of counts of n-grams of each of a plurality of sizes in the source corpus of the respective domain that are present in the phrase table or multi-model with which the similarity is being computed.

6. The method of claim 5, wherein each similarity measure may be computed as a function of $$\left( \prod_{n=p}^{n=q} \frac{\text{match}(n \mid pt, s)}{\text{total}(n \mid s)} \right)^{\frac{1}{r}},$$

where match(n|pt,s) is the count of n-grams of order n in the monolingual source corpus s that exist in a source side of a respective phrase table pt,
total(n|s) is the number of n-grams of order n in the source corpus, and
p is a first value of n, q is a second value of n higher than p, and r is the total number of values of n used in the computation.

7. The method of claim 1, wherein the generating of the multi-model for the target domain comprises combining the phrase tables for the comparative domains in a weighted combination in which each of the comparative domain phrase tables is weighted as a function of the measure of similarity between the source corpus for the target domain and the comparative domain phrase table.

8. The method of claim 1, wherein the multi-model for a first of the comparative domains is generated by combining the phrase tables for others of the comparative domains in a weighted combination in which each of the other comparative domain phrase tables is weighted as a function of the measure of similarity between the source corpus for the first comparative domain and the other comparative domain phrase table.

9. The method of claim 1, wherein the method is performed without access to a parallel corpus in the target domain.

10. The method of claim 1, wherein the set of comparative domains comprises at least three comparative domains.

11. The method of claim 1, wherein the translation scoring function is a log-linear scoring function.

12. The method of claim 1, wherein the features of the translation scoring function include features selected from the group consisting of lexical features, phrasal features, reordering features, and language model features.

13. The method of claim 12, wherein the features of the translation scoring function include lexical features, phrasal features, reordering features, and at least one language model feature.

14. The method of claim 1, wherein each of the comparative domain phrase tables includes biphrase features for each of a set of biphrases, each biphrase including a source phrase and a corresponding target phrase, the biphrase features having been derived from a parallel corpus of source and target text strings.

15. A computer program product comprising a non-transitory recording medium storing instructions, which when executed on a computer, causes the computer to perform the method of claim 1.

16. A system for estimating parameters for features of a translation scoring function comprising memory which stores instructions for performing the method of claim 1 and a processor in communication with the memory for executing the instructions.

17. A machine translation system comprising memory which stores instructions for scoring translations of source text with a translation scoring function, the translation scoring function including parameters estimated by the method of claim 1, and a processor which executes the instructions.

18. The method of claim 1, wherein each of the comparative domain phrase tables includes at least 10,000 biphrases.

19. The method of claim 1, wherein the translation scoring function is a log-linear model of the general form:

$$\text{score}(t_1|s_1) = 1/z \exp(\Sigma_{m=1}^{M} \lambda_m h_m(s_1,t_1)) \quad (1),$$

where $s_1$ represents a source language text string, $t_1$ represents a candidate translation of the source string in the target language, $h_m$ represents one of M features, $\lambda_m$ is a respective estimated parameter for the feature, and Z is an optional normalization constant.

20. The method of claim 19, wherein M is at least 9.

21. A system for estimating parameters for features of a translation scoring function for performing machine translation in a target domain comprising:
  memory which stores a monolingual source corpus for a target domain or n-grams present the monolingual source corpus, the monolingual source corpus comprising sentences in a source language;
  a similarity computation component which computes a measure of similarity between the target domain monolingual source corpus and a phrase table for each of a set of comparative domains by comparing n-grams present the monolingual source corpus and source language phrases in the phrase table;
  a multi-model computation component which generates a multi-model for the target domain based on the phrase tables for the comparative domains and the computed measures of similarity, the generated target domain multi-model being a weighted combination of two or more of the phrase tables for the comparative domains;
  the similarity computation component further computing, for the target domain, a measure of similarity between the source corpus and the target domain multi-model;
  the similarity computation component further computing a measure of similarity for each of the comparative domains between a respective comparative domain source corpus and a respective comparative domain multi-model that is derived from phrase tables for others of the set of the comparative domains, each of the plurality of comparative domains being associated with parameters for at least some of the features of the translation scoring function;
  a parameter computation component which estimates the parameters of the translation scoring function for the target domain based on the computed measure of similarity between the source corpus and the target domain multi-model, the computed measures of similarity for the comparative domains, and the parameters for the scoring function for the comparative domains;
  a statistical machine translation component which scores translations of source text with the translation scoring function, at least some of the features of the translation scoring function being computed based on the target domain multi-model; and
  a processor for implementing the similarity computation component, multi-model computation component, and parameter computation component.

22. A method for estimating parameters for features of a translation scoring function for scoring candidate translations in a target domain comprising:
  for each of a plurality of parameters of the translation scoring function, learning a mapping function which maps a similarity measure to the parameter of the translation scoring function, the similarity measure being computed between a source corpus for one domain and a respective multi-model derived from phrase tables of other domains;
  receiving a source corpus for a target domain;
  generating a multi-model for the target domain based on phrase tables of comparative domains, the multi-model for the target domain being a phrase table which includes feature values for each of a set of such biphrases, the multi-model for the target domain being formed by combining at least two of the phrase tables of the comparative domains;
  computing a measure of similarity between the target domain source corpus and the target domain multi-model;
  based on the computed measure of similarity and the mapping functions, estimating the plurality of parameters for the translation scoring function for the target domain;
  incorporating the translation scoring function into a statistical machine translation system,
  wherein the learning of the mapping function, generating of the target domain multi-model, computing the measure of similarity, and the estimating of the set of parameters for the translation scoring function are performed with a computer processor.

* * * * *